March 26, 1929.    L. R. BARBER    1,706,515
PORTABLE ELECTRIC HEATING DEVICE
Original Filed Aug. 25, 1924
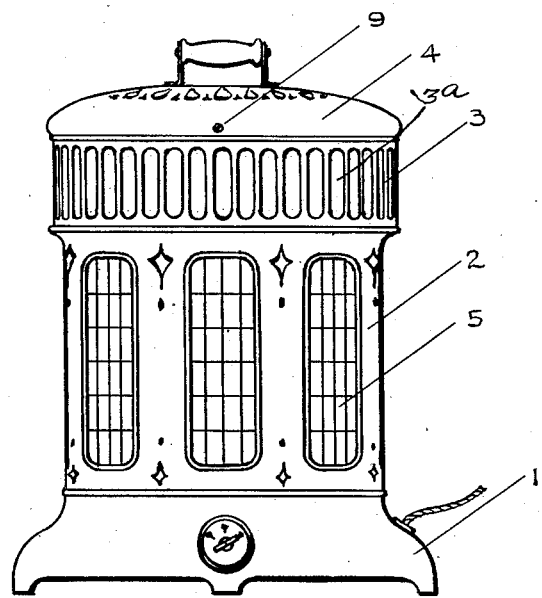
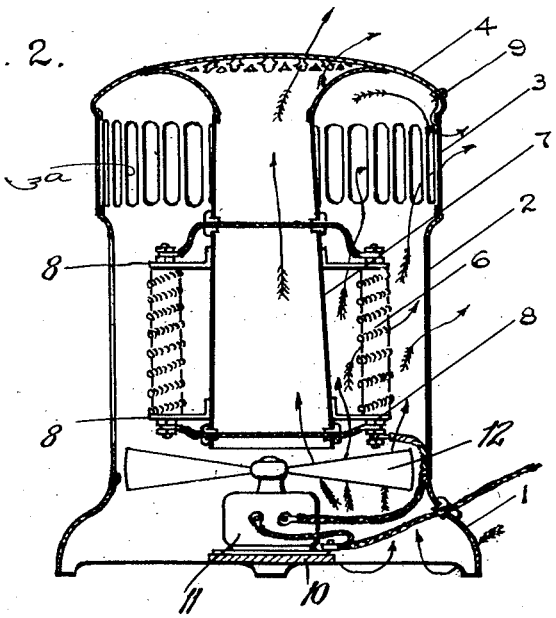
INVENTOR
Lewis R. Barber
BY himself
ATTORNEY Patented Mar. 26, 1929.

1,706,515

UNITED STATES PATENT OFFICE.

LEWIS R. BARBER, OF FRESNO, CALIFORNIA.

PORTABLE ELECTRIC HEATING DEVICE.

Application filed August 25, 1924, Serial No. 734,056. Renewed October 30, 1928.

The primary object of my invention is to provide an electric heating device, operating to draw currents of air into itself, warm them to a desired temperature and direct them out into the room to be heated, thus providing circulation, ventilation and dissemination of heat in a manner more efficient than now secured.

A further object is to secure the passage of air currents directly around and in contact with the heat elements thereby absorbing heat and passing it rapidly out into the space desired to be heated, also operating to hold the incandescence or visible heat of the heating elements down to a point where oxidization is checked and the life of the heat elements prolonged.

I accomplish this and other objects by means of the device disclosed herein and illustrated in the accompanying drawings forming a part hereof in which:

Fig. 1 is a side elevation of my device ready for use.

Fig. 2 is a central vertical section of Fig. 1.

Referring to the drawings my device comprises a hollow base 1, of cast or pressed metal, upon the upper end of which is mounted the lower end of an outer casing or shell 2, which shell extends upwardly and supports at its upper end an annular band or ring 3, which band is provided with a plurality of spaced apertures 3ª. A dome or cover 4 has a downwardly depending rim which snugly fits within the upper edge of band 3, screws 9 being provided to hold the same against accidental displacement.

It will be noted that dome 4 is so shaped as to direct the air currents out through the perforations 3ª after being heated. Depending downwardly from the center of dome 4 is a cylindrical casing 7, preferably of metal, which extends downwardly to near the bottom of casing 2, and extending radially from the outer periphery are a plurality of brackets 8 which support the heat elements 6. Extending across the lower end of base 1 is a platform 10 upon which is adapted to be mounted a motor 11 to extend vertically, and mounted on the inner end of said motor is a fan or ventilator 12, motor 11 being connected to a source of electrical energy, not shown.

In the operation of the device, as the fan 12 is rotated by motor 11 air will be drawn inwardly beneath base 1 and forced upwardly through the casing 2 over and around the heat elements 6 and then out through apertures 3ª into the room to be heated. In the event inspection or adjustment becomes necessary, by loosening screws 9 dome 4 may be removed and with it the interior mechanism.

Having described my invention, what I claim is:—

1. An air heater and circulator comprising a hollow base; a casing mounted at its lower end upon the upper end of said base; a band mounted at its lower end upon the upper end of said casing to extend upwardly provided with a plurality of spaced apertures; a cover mounted upon the upper end of said band; a cylindrical casing depending downwardly from said cover, centrally of said first casing and extending to near the bottom thereof; a plurality of electric heating elements carried by said inner casing on the outer periphery thereof, the upper end of said casing being flared outwardly to form a deflector; a blower mounted upon said base within said casing adapted to force air upwardly therethrough; and an electric motor for operating said blower.

2. An air heater and circulator comprising a main vertically elongated casing having a plurality of spaced apertures in the side walls thereof intermediate its length; a band surrounding the upper end of said casing and secured thereto to extend upwardly therefrom provided with a plurality of spaced apertures therethrough; a closure removably mounted in the upper end of said band; a fan mounted within said base concentric with said casing adapted to force air upwardly therethrough; a cylindrical casing depending downwardly from said closure to near the bottom of said first casing and having its lower end open, the upper end of said casing being flared outwardly to form a deflector adapted to deflect air forced upwardly by said fan through the apertures in said band; a plurality of radially extending electric heat elements carried by said cylindrical casing between the same and said outer casing; a source of energy for said heat elements.

3. An air heater and circulator comprising a hollow base; a cylindrical casing secured at its lower end to said base to extend upwardly therefrom and being provided around its upper end with a plurality of spaced elongated apertures; a closure for the upper end of said casing; a tubular casing depending downwardly from said closure within said casing concentric therewith and having its lower end open; a plurality of electric heat elements carried by said tubular casing between the same and said outer casing; and a blower mounted in said base concentric with said casing adapted to draw air upwardly through said base into said outer casing.

In witness whereof I have hereunto set my signature.

LEWIS R. BARBER.